Patented Feb. 6, 1951

2,540,996

UNITED STATES PATENT OFFICE 2,540,996

PROCESS FOR PROTECTING PLASTIC AND ENAMELED SURFACES AND COMPOSITION THEREFOR

Laurence L. Ryden, Midland, Mich., assignor to The Dow Chemical Company, Midland, Mich., a corporation of Delaware No Drawing. Application January 14, 1948, Serial No. 2,332

8 Claims. (Cl. 260—28.5)

This invention concerns an improved method for protecting plastic and enameled surfaces against damage during handling, storage, or shipment by forming on the surfaces an adherent, but readily removable, plastic coating prepared from styrene and butadiene. It pertains especially to formation of protective strip coatings from aqueous emulsions comprising blends of aqueous colloidal polystyrene dispersions and synthetic latices containing copolymers of styrene and butadiene.

The invention resides in the discovery that latices, obtained by copolymerizing in aqueous emulsion mixtures of styrene and butadiene containing from 40 to 75 per cent by weight butadiene, can be blended with aqueous colloidal polystyrene dispersions to produce mixed aqueous emulsions that dry to form tough plastic films which are readily stripped from smooth surfaces.

It is a primary object of the invention to provide a coating suitable for protecting plastic and enameled surfaces against scratching, chipping, and marring during processing and shipping. Another object is to provide resilient tough protective coatings which can readily be stripped from such surfaces. A further object is to provide aqueous compositions suitable for forming such protective coatings from mixtures of aqueous colloidal polystyrene dispersions and synthetic latices containing copolymers of styrene and butadiene. Other and related objects will become apparent as the description of the invention proceeds.

Polymethylmethacrylate resins or the like are widely used in the manufacture of transparent enclosures for aircraft, such as pilot's enclosure, windows, astrodomes, and as observation domes for busses and passenger trains because of their structural characteristics and transparency, and because they can readily be formed to the various shapes desired. Methylmethacrylate resin, in contrast to glass, has a soft surface which is easily damaged by scratching or abrasion during the ordinary handling encountered in processing, shipping, and assembling of the parts in other structural units. The resin also reacts chemically with many of the solvents employed in paints applied to adjacent surfaces, and while the paint may be removed from the plastic surface by scraping, it will be found that the surface beneath the paint has deteriorated. Such damage may be avoided by covering the plastic during painting of nearby surfaces.

The plastic articles, as usually furnished, are protected by a covering of paper having a cement or adhesive coating on one side to provide adherence to the plastic surface. However, it is difcult to apply a smooth coating of such paper to irregular shaped or curved surfaces of the plastic. Solutions of methylcellulose or polyvinyl alcohol in water have been employed to provide temporary protective coatings for methylmethacrylate resin surfaces. Such coatings have the disadvantage that, being composed essentially of water-soluble compounds, they deteriorate and may be destroyed by a moist atmosphere or on standing out-of-doors.

The liquid protective coating compositions provided by the present invention have the advantage of forming an elastic, tough, adherent, but readily removable plastic film that is insoluble in water, resistant to organic solvents, does not crack or break on flexing, and is non-injurious to enameled and plastic surfaces. The compositions may readily be applied to surfaces, e. g. of curved or irregular shape, by brushing, spraying, dipping, or in other suitable manner.

I have found that such coating composition may be prepared by blending an aqueous colloidal polystyrene dispersion obtained by polymerizing styrene in aqueous emulsion with a synthetic latex obtained by copolymerizing styrene with butadiene, provided the two colloidal dispersions are admixed in proportions such that the butadiene chemically combined in the copolymer constitutes from 25 to 35, preferably from 26 to 30, per cent of the combined weight of the polystyrene and the copolymer. A minor amount of a wax, or other lubricant, is added to facilitate stripping of a dried film of the resinous material from surfaces on which it is formed. Other addition agents such as antioxidants, dyes or pigments, etc., may be added, usually with advantage.

The blends of latices of this invention should not be confused with latices obtained by copolymerizing monomeric mixtures of styrene and butadiene containing butadiene in the above proportions. Such latices are not operable in practice of the invention. Neither are latices obtained by first polymerizing styrene substantially to completion in aqueous emulsion, then adding butadiene in the above proportions, and thereafter polymerizing the butadiene while in the emulsion. Nor are the latices obtained by reversing this procedure, i. e. first polymerizing the butadiene in aqueous emulsion to substantial completion, then adding styrene and polymerizing it while in the emulsion, applicable in practice of the invention.

The synthetic latices employed in preparing the aqueous coating compositions of this invention may be obtained by separately polymerizing styrene and mixtures of styrene with butadiene in aqueous emulsion by known procedure, e. g. by heating styrene in admixture with water containing an emulsifying agent and in the presence of a catalyst such as hydrogen peroxide, benzoyl peroxide, lauroyl peroxide, potassium persulfate, or sodium perborate, etc.

The copolymer latex, i. e. the latex obtained by copolymerizing mixtures of styrene and butadiene in aqueous emulsion, may be prepared from monomeric mixtures consisting of from 40 to 75 per cent by weight of butadiene and from 60 to 25 per cent styrene and preferably are prepared from monomeric mixtures consisting of from 40 to 60 per cent butadiene and from 60 to 40 per cent styrene.

The concentration of solids in the latices may vary within wide limits. In general, latices containing 10 per cent by weight or more of solids may be employed, but for reasons which will become more apparent as the description of the invention proceeds, it is preferred to use latices containing a high concentration of the resinous material, e. g. 35 per cent or more.

Small amounts of release agents, i. e. from 5 to 20 per cent by weight of the resinous product, such as paraffin, chlorinated paraffin, butyl stearate, soyabean oil, paraffin oil, or the like, are added to the mixture of latices to facilitate stripping of the dried protective coating from the surfaces. Such release agents are preferably employed in admixture with a small proportion of a polyethylene glycol such as a Carbowax having an average molecular weight between 4000 and 8000. When employing mixtures of the above release agents and Carbowax, the proportion of release agent can be correspondingly reduced. Thus a composition containing 5 per cent Carbowax 6000 and 10 per cent paraffin, based on the weight of resinous product, dries to form adherent films that can readily be stripped from a sheet of polymethylmethacrylate resin.

The release agents are most readily added as aqueous emulsions thereof to the mixture of latices. Emulsions of the release agents may be prepared by mixing the desired compound or mixture of compounds with water containing an emulsifying agent and, if desired, Carbowax and passing the mixture through a colloid mill until a homogeneous emulsion is obtained, and thereafter adding the emulsion to the mixed latices.

It is of advantage, prior to applying the coating composition by brushing or dipping, particularly when applying the coating to polished plastic surfaces, to thicken the mixture of latices by adding thereto small proportions of water-soluble hydrophilic compounds such as methylcellulose, Cellosize WS (hydroxyethylcellulose), algin, casein, sodium cellulose glycolate, or the like. In general, the coating compositions are thickened to a consistency comparable to that of paint. This is usually accomplished by adding to the latex mixture from 0.02 to 10 per cent by weight of the above-described water-soluble hydrophilic compounds as aqueous solutions of the latter.

Pigments, dyes, coloring agents, etc., may be added to the aqueous coating compositions as a convenience to give a ready indication of whether a particular surface has been covered with the protective coating and as an aid in removing the coating since the dry film is translucent and is sometimes difficult to detect.

In a preferred practice of the invention an aqueous coating composition is prepared by blending a latex obtained by copolymerizing in aqueous emulsion a mixture consisting of 60 per cent styrene and 40 per cent butadiene with a polystyrene latex in proportions such that the butadiene is present as a copolymer in amounts corresponding to from 25 to 35 per cent by weight of the combined polymeric material. There are added, to the latex mixture, a lubricant, e. g. paraffin, and Carbowax (polyethylene glycol having an average molecular weight between 4000 and 8000) in amounts corresponding, respectively, to between 5 and 15 per cent and between 5 and 10 per cent of the combined weight of the polymers in the latex mixture. The resultant mixture is thickened by adding from 0.02 to 10 per cent of a water-soluble hydrophilic compound such as methylcellulose. Small amounts of antioxidants, i. e. from 0.1 to 2 per cent by weight of the combined polymers in the aqueous emulsion, are preferably added to the coating composition to minimize stiffening of the dry protective coating.

The aqueous coating composition is applied, e. g. by brushing, to the surface to be protected and the strippable protective film is formed by drying the coating. Drying is usually accomplished at room temperature or slightly above, e. g. at from 15° to 40° C. One or more layers of the coating may be applied to the surface by allowing the coating to dry or partially dry between successive applications of the coating composition.

To remove the film from the surface to which it is applied, a paper tab or the like may conveniently be placed against the coating while still wet and allowing it to dry in place, and thereafter using it to break the film. The film may be broken in other ways such as by placing a thread on the plastic surface before coating it, and thereafter pulling the thread to break the dried film.

The following examples illustrate practice of the invention, but are not to be construed as limiting the scope thereof:

EXAMPLE 1

An aqueous colloidal polystyrene dispersion (hereinafter termed a latex) containing 40 per cent by weight of polystyrene was blended, in the proportions shown in Table I, with a synthetic latex containing 50 per cent solids, obtained by copolymerizing a mixture consisting of 60 per cent by weight styrene and 40 per cent butadiene in aqueous emulsion. Coatings of the aqueous emulsion were applied to flat sheets of polymethylmethacrylate resin and allowed to dry at room temperature, i. e. about 25° C. After drying, the coatings were stripped from the plastic and rated according to the toughness of the film and its strippability from the plastic surface. No lubricants or release agents were employed in these tests. The proportions used are reported as parts by weight.

*Table I*

| Latex Blend No. | Parts of Copolymer Latex (50% solids) | Parts of Polystyrene Latex (40% solids) | Film Toughness | Strippability |
|---|---|---|---|---|
| 1 | 80 | 25 | Soft | Poor. |
| 2 | 75 | 31 | do | Fair. |
| 3 | 70 | 38 | Good | Good. |
| 4 | 65 | 44 | do | Do. |
| 5 | 60 | 50 | do | Film breaks. |

The films containing from 26 to 30 per cent butadiene present as a copolymer (blends 2–4 inclusive) were elastic, soft to tough coatings having good adhesive properties, but could readily be stripped from the plastic surfaces. Coatings of similar blends of the latices, but containing 15 per cent of paraffin dispersed therein as a release agent, when applied to the surface of molded polystyrene sheets and enameled iron plates and dried in like manner, formed adherent films which were readily removable from such surfaces by stripping.

EXAMPLE 2

Portions of the polystyrene latex and the latex of a copolymer of 60 per cent styrene and 40 per cent butadiene employed in Example 1 were used to prepare a series of mixed latices containing 2 parts by weight of the copolymer and 1 part of the polystyrene. To each of the mixed latices there was added the proportions of paraffin wax and Carbowax 6000 (polyethylene glycol having an average molecular weight of 6000) indicated in Table II and 6 parts by weight of an aqueous solution containing 6 per cent by weight of methylcellulose (15 cps.)

The paraffin was added as an aqueous emulsion of 50 per cent by weight concentration. Such an emulsion is marketed as Nopco 2252 by the National Oil Products Company. The Carbowax was added as a 33 per cent solution in water.

The aqueous compositions were brushed onto flat sheets of methylmethacrylate resin and dried at room temperature. The dried films were stripped from the plastic sheets and rated according to their stripping behavior.

*Table II*

| Run No. | Polymer, parts by weight | Parts by weight per 100 parts of polymer | | Stripping Behavior |
|---|---|---|---|---|
| | | Paraffin | Carbowax 6000 | |
| 1 | 110 | 5 | 5 | Good. |
| 2 | 110 | 5 | 10 | Do. |
| 3 | 110 | 10 | 5 | Do. |
| 4 | 110 | 10 | 10 | Do. |

The adhesiveness of the films to plastic surfaces can readily be modified by adding thereto varying proportions of release agents. Too great a proportion of release agent or lubricant will result in films of lowered strength. Thus, the film of run 4, containing 10 parts paraffin and 10 parts Carbowax 6000, was the weakest of the series although satisfactory as a protective strip-coating.

EXAMPLE 3

A polystyrene latex containing 42 per cent solids and a copolymer latex obtained by copolymerizing a mixture of 60 per cent styrene and 40 per cent butadiene in aqueous emulsion and containing 50 per cent solids were used to prepare a series of blends of the latices wherein the butadiene present as a copolymer constituted 28 per cent by weight of the total polymeric material. To each of the blends there was added paraffin in aqueous emulsion in the amounts set forth in Table III. The latex compositions were coated on flat sheets of polymethylmethacrylate resin and dried at room temperature. After drying, the films were stripped from the plastic sheets and rated for toughness and strippability.

*Table III*

| Run No. | Polymer, parts by weight | Paraffin, parts by weight per 100 parts of polymer | Film | |
|---|---|---|---|---|
| | | | Toughness | Strippability |
| 23 | 100 | 12 | Good—Tacky | Good. |
| 18 | 100 | 15 | Good | Do. |
| 24 | 100 | 15 | do | Do. |
| 25 | 100 | 17 | Fair | Do. |
| 26 | 100 | 20 | do | Do. |

As shown in Table III the toughness of the films may be modified by changing the proportions of paraffin employed. Proportions greater than about 20 parts of paraffin wax per 100 parts of resinous material decrease the strength of the film. Other release agents vary somewhat, but usually only in degree, from the data here shown for paraffin. In general, most satisfactory results are obtained by employing from 5 to 15 per cent of the release agents with from 10 to 5 per cent of a Carbowax (polyethylene glycol having an average molecular weight of from 4000 to 8000).

The aqueous coating compositions may be applied to the surfaces of formed solid organic plastics such as polystyrene, ethylcellulose, cellulose acetate, polymethylmethacrylate, Celluloid, or the like to provide temporary protective coatings. They may also be applied to painted surfaces and to enameled and glass-coated metal surfaces.

Other modes of applying the principle of my invention may be employed instead of those explained, change being made as regards the method or products herein disclosed, provided the steps or products stated in any of the following claims or the equivalent of such stated steps or products be employed.

I therefore particularly point out and distinctly claim as my invention:

1. A method of protecting solid organic plastic and enameled surfaces which comprises applying to such surface an aqueous coating comprising a blend of an aqueous colloidal polystyrene dispersion with a synthetic latex containing a copolymer of from 40 to 75 per cent butadiene and from 60 to 25 per cent styrene in proportions such that the butadiene present as a copolymer corresponds to from 25 to 35 per cent of the combined weight of the polymeric material, said aqueous coating containing an organic lubricant selected from the group consisting of paraffin, chlorinated paraffin and paraffin oil dispersed therein in amounts corresponding to from 5 to 20 per cent of the polymeric material and thereafter drying the aqueous coating to provide an adherent but readily removable protective plastic coating.

2. A method of protecting solid organic plastic surfaces which comprises applying to such plastic surface an aqueous coating comprising a blend of an aqueous colloidal polystyrene dispersion with a synthetic latex containing a copolymer of about 40 per cent butadiene and about 60 per cent styrene in proportions such that the butadiene present as a copolymer corresponds to from 25 to 35 per cent of the combined weight of the polymeric material, said aqueous coating containing an organic lubricant selected from the group consisting of paraffin, chlorinated paraffin and paraffin oil dispersed therein in amounts corresponding to from 5 to 20 per cent of the polymeric material, and drying the aqueous coating to provide an adherent but readily removable plastic coating.

3. A method of protecting solid organic plastic surfaces which comprises applying to such plastic surface an aqueous coating comprising a blend of an aqueous colloidal polystyrene dispersion with a synthetic latex containing a copolymer of from 40 to 60 per cent butadiene and from 60 to 40 per cent styrene in proportions such that the butadiene present as a copolymer corresponds to from 25 to 35 per cent of the combined weight of the polymeric material, said aqueous coating containing an organic lubricant selected from the group consisting of paraffin, chlorinated paraffin and paraffin oil dispersed therein in amounts corresponding to from 5 to 20 per cent of the polymeric material, drying the aqueous coating to provide an adherent but readily removable protective coating and thereafter stripping the coating from the plastic surface.

4. In a method of protecting solid organic plastic surfaces, the improvement which comprises applying to such surface an aqueous emulsion comprising a blend of an aqueous collodal polystyrene dispersion and a synthetic latex containing a copolymer of from 40 to 75 per cent butadiene and from 60 to 25 per cent styrene in proportions such that the butadiene present as a copolymer corresponds to from 26 to 30 per cent of the combined weight of polymeric material, said aqueous emulsion containing an organic lubricant selected from the group consisting of paraffin, chlorinated paraffin and paraffin oil dispersed therein, in amounts corresponding to from 5 to 20 per cent of the polymeric material, drying the aqueous coating to provide an adherent but readily removable protective coating, and thereafter removing the coating from the plastic surface.

5. Polymethylmethacrylate having a surface coated with a film comprising an intimate mixture of polystyrene and a copolymer of from 40 to 75 per cent butadiene and from 60 to 25 per cent styrene in proportions such that butadiene present as a copolymer corresponds to from 25 to 35 per cent of the combined weight of polymeric material and from 5 to 20 per cent of an organic lubricant selected from the group consisting of paraffin, chlorinated paraffin and paraffin oil, which coating may readily be stripped from the polymethylmethacrylate surface.

6. A coating composition adapted to form a readily removable protective coating for plastic and enameled surfaces, which composition consists of an aqueous emulsion comprising essentially a blend of an aqueous colloidal dispersion of polystyrene and a synthetic latex of a copolymer of from 40 to 75 per cent butadiene and from 60 to 25 per cent styrene in proportions such that butadiene chemically combined in the copolymer is present in amount corresponding to from 25 to 35 per cent of the combined weight of the polymeric material, and an organic lubricant consisting of paraffin and polyethylene glycol having a molecular weight between 4000 and 8000 in the ratio from 1 to 3 parts by weight of paraffin per part of polyethylene glycol, in amount corresponding to from 5 to 20 per cent of the weight of the polymeric material.

7. A coating composition adapted to form a readily removable protective coating for plastic surfaces, which composition consists of an aqueous emulsion comprising essentially a blend of an aqueous colloidal dispersion of polystyrene and a synthetic latex of a copolymer of 40 per cent butadiene and 60 per cent styrene in proportions such that butadiene chemically combined in the copolymer is present in amount corresponding to from 25 to 35 per cent of the combined weight of the polymeric material, and an organic lubricant consisting of approximately equal parts by weight of paraffin and polyethylene glycol having a molecular weight between 4000 and 8000 in amount corresponding to from 5 to 20 per cent of the weight of the polymeric material.

8. A coating composition adapted to form a readily removable protective coating for polymethylmethacrylate resin surfaces, which composition consists of an aqueous emulsion comprising essentially a blend of an aqueous colloidal dispersion of polystyrene and a synthetic latex of a copolymer of 40 per cent butadiene and 60 per cent styrene in proportions such that butadiene chemically combined in the copolymer is present in amount corresponding to from 25 to 35 per cent of the combined weight of the polymeric material, and paraffin, in amount corresponding to from 5 to 20 per cent of the weight of the polymeric material.

LAURENCE L. RYDEN.

REFERENCES CITED

The following references are of record in the file of this patent:

UNITED STATES PATENTS

| Number | Name | Date |
| --- | --- | --- |
| 2,320,533 | Muskat et al. | June 1, 1943 |
| 2,333,887 | Redlinger | Nov. 9, 1943 |
| 2,356,965 | Allison | Aug. 29, 1944 |
| 2,431,684 | Brophy | Dec. 2, 1947 |

OTHER REFERENCES

J. Polymer Science, vol. I of 1946, pp. 429–433.